(12) United States Patent
Cooper-Balis et al.

(10) Patent No.: US 11,494,119 B2
(45) Date of Patent: Nov. 8, 2022

(54) MEMORY SEARCHING COMPONENT

(71) Applicant: Micron Technology, Inc., Boise, ID (US)

(72) Inventors: Elliott C. Cooper-Balis, San Jose, CA (US); Robert M. Walker, Raleigh, NC (US); Paul Rosenfeld, Rockville, MD (US)

(73) Assignee: Micron Technology, Inc., Boise, ID (US)

( * ) Notice: Subject to any disclaimer, the term of this patent is extended or adjusted under 35 U.S.C. 154(b) by 55 days.

(21) Appl. No.: 17/017,396

(22) Filed: Sep. 10, 2020

(65) Prior Publication Data

US 2022/0075558 A1 Mar. 10, 2022

(51) Int. Cl.
*G06F 3/06* (2006.01)
(52) U.S. Cl.
CPC ............ *G06F 3/0659* (2013.01); *G06F 3/061* (2013.01); *G06F 3/0653* (2013.01); *G06F 3/0658* (2013.01); *G06F 3/0679* (2013.01)
(58) Field of Classification Search
None
See application file for complete search history.

(56) References Cited

U.S. PATENT DOCUMENTS

| | | | |
|---|---|---|---|
| 7,225,186 B2 | 5/2007 | Rao | |
| 8,935,275 B2 | 1/2015 | Rathod | |
| 2017/0109058 A1* | 4/2017 | Shallal | G06F 3/0685 |
| 2018/0121477 A1 | 5/2018 | Mulay et al. | |
| 2018/0173447 A1* | 6/2018 | Chin | G06F 3/0619 |
| 2019/0243565 A1 | 8/2019 | Shilane et al. | |
| 2019/0370168 A1* | 12/2019 | Muthiah | G06F 12/0292 |
| 2020/0012595 A1* | 1/2020 | Bordia | G06F 3/0673 |
| 2020/0020398 A1* | 1/2020 | Miller | G06F 3/0653 |
| 2022/0027233 A1* | 1/2022 | Klein | G06F 11/1068 |

FOREIGN PATENT DOCUMENTS

CN 101276334 B 4/2011

\* cited by examiner

*Primary Examiner* — Kevin Verbrugge
(74) *Attorney, Agent, or Firm* — Brooks, Cameron & Huebsch, PLLC (57) ABSTRACT

An apparatus can include a memory device comprising a memory component and a memory controller that is coupled to the memory component. A memory searching component (MSC) is resident on the apparatus. The MSC can receive an external instruction indicative of performance of an operation to retrieve particular data from the memory component and issue, responsive to receipt of the instruction, a command to the memory controller to cause the memory controller to perform a read request invoking the memory component as part of performance of the operation in the absence of a further external instruction.

26 Claims, 4 Drawing Sheets

MEMORY SEARCHING COMPONENT

TECHNICAL FIELD

The present disclosure relates generally to semiconductor memory and methods, and more particularly, to apparatuses, systems, and methods relating to a memory searching component.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

An apparatus can include a memory device comprising a memory component and a memory controller that is coupled to the memory component. A memory searching component (MSC) can be resident on the apparatus. The MSC can receive an external instruction indicative of performance of an operation to retrieve particular data from the memory component and issue, responsive receipt of the instruction, a command or commands to the memory controller to cause the memory controller to perform a read request invoking the memory component as part of performance of the operation in the absence of a further external instruction.

Computing systems may perform a wide range of tasks during operation. In the course of performing such tasks, a computing system can execute various search functions to locate and/or retrieve data stored within the computing system. For example, data that may be used by the computing system during operation to perform a task can be stored within a memory device associated with the computing system. In order to access such data, a host may perform one or more search functions to locate and/or retrieve the data from the memory device and process the data as part of performing computing tasks.

In some approaches, execution of search functions may be performed by a host computing system (e.g., by a central processing unit in conjunction with a cache deployed on the host) by issuing a command (or an instruction) that traverses a communication path coupling the host to the memory device. The requested data may be transferred back to the host via the communication path and the data can be processed by the host to, for example, determine if the retrieved data matches the requested data.

However, if the retrieved data does not match the requested data, one or more additional commands may be issued to locate and retrieve the requested data. Every time such a command is issued, the command must traverse the communication path to reach the memory system, the data must traverse the communication path to reach the host, and the host must process the data to determine if the retrieved data matches the requested data.

These additional traversals of the communication path can affect the performance of the computing system by incurring increases in memory accesses, data movement, and compute time, as well as increasing cache pressure on the host computing system. Further, a successful retrieval of the data may not occur, which can lead to scenarios in which additional memory accesses, data movement, and compute time are incurred for naught.

The increases in memory accesses, data movement, and compute time, as well as increased cache pressure on the host computing system can be further exacerbated when the requested data corresponds to a search node that is part of a data structure. As used herein, a "data structure" refers to a data organization, management, and storage format that enables access and modification to nodes (e.g., search nodes or data nodes) that make up the data structure. A data structure can include a collection of data values, the relationship between the data values, and/or functions and operations that can be applied to the data. Non-limiting examples of data structures include data trees, linked lists, containers, graphs, queues, etc.

In an example in which a search node is accessed as part of retrieving the requested data from a memory device, a command to retrieve the search node from the memory device can be generated by the host and transferred via a communication path to the memory device. This command may contend with other system and/or memory traffic that is also routed over the communication path, which can potentially delay critical accesses to the memory device. In addition, data traffic associated with transfer of the retrieved data from the memory device to the host can contend with other system and/or memory traffic routed over the communication path. As described above, these processes may be repeated until the requested search node is located and successfully retrieved.

The process of determining whether the requested data associated with a search node has been successfully retrieved can include retrieving data associated with a search node, transferring the data associated with the search node to the host, and performing operations (e.g., arithmetic operations, logical operations, compare operations, etc.) on the data associated with the retrieved search node. If the data associated with the search node does not match the requested data, the process continues and data associated with another search node is retrieved and the operations to determine if the data associated with the search node matches the requested data is repeated until the requested data is successfully located and transferred to the host or until all search possibilities have been exhausted and a determination is made that the search for the requested data has failed.

Retrieving a non-matching search node can cause a cold cache line that is not used to be fetched, which can potentially evict a useful cache line. Further, because some approaches perform the operations to determine if the search node retrieval was successful on the host, potentially useless CPU cycles can be incurred. This can reduce the efficacy of the host and can result in increased power consumption of the computing system. In addition, cache pressure and/or cache pollution can become problematic as search nodes that are ultimately useless can be cached by the host during such search and retrieval operations. These issues can be further exacerbated when certain data structures, such as linked lists, graphs, and the like are involved, as these types of data structures are generally accessed serially.

In contrast, embodiments herein are directed to performance of search functions using a component (e.g., a "memory searching component") that is resident on an apparatus, such as a memory system, memory device, memory sub-system, or the like. By providing a component to perform the search and retrieval operations described above that is resident on, for example the apparatus, the number of traversals of the communication path between the host and the memory device can be decreased in comparison to approaches that perform search and retrieval operations on the host. This can reduce the number of wasted CPU cycles that are inherent in the approaches described above, which can improve the overall performance of the computing system and/or reduce an amount of power consumed by the computing system in performing such operations. In addition, by providing a component to perform search and retrieval operations that is resident on the apparatus, host cache pollution and/or cache pressure can be reduced in comparison to the approaches described above.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "N" and "M," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context.

The figures herein follow a numbering convention in which the first digit or digits correspond to the figure number and the remaining digits identify an element or component in the figure. Similar elements or components between different figures may be identified by the use of similar digits. For example, 102 may reference element "02" in FIG. 1, and a similar element may be referenced as 202 in FIG. 2. A group or plurality of similar elements or components may generally be referred to herein with a single element number. For example, a plurality of reference elements 222-1, 222-2, . . . , 222-N or 222-1 to 222-N, for simplicity, may be referred to generally as 222. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

Figure 1:
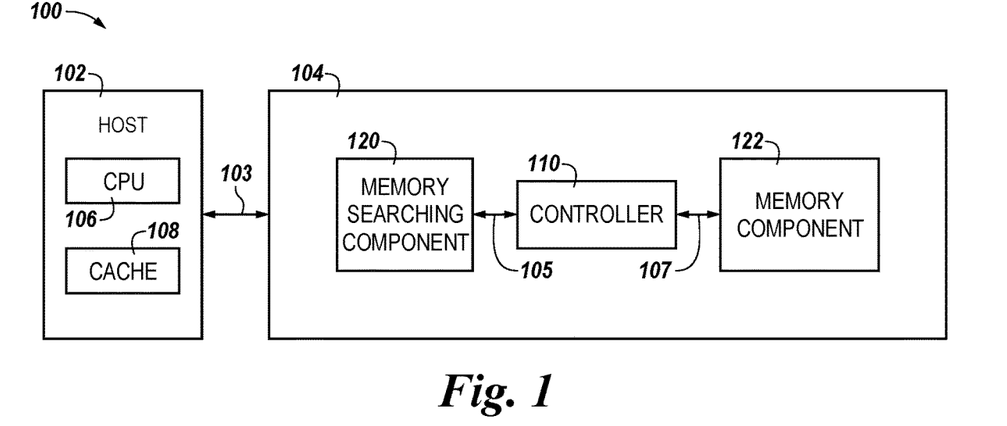
FIG. 1 is a functional block diagram in the form of an apparatus including a host and memory device in accordance with a number of embodiments of the present disclosure.

FIG. 1 is a functional block diagram in the form of an apparatus 100 including a host 102 and memory device 104 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. In some non-limiting embodiments, an "apparatus" can refer to a memory system, a memory device, a memory sub-system, or the like. As shown in FIG. 1, the host 102 can include a central processing unit (CPU) 106 and a cache 108, while the memory device 104 can include a memory searching component 120, a controller 110, and a memory component 122. The host 102 may be communicatively coupled to the memory device 104 via a communication path 103.

The host 102 can include a system motherboard and/or backplane and can include a number of processing resources (e.g., one or more processors, microprocessors, or some other type of controlling circuitry) such as a CPU 106. The system 100 can include separate integrated circuits or both the host 102 and memory device 104 can be on the same integrated circuit. The host 102 can further include one or more caches 108. The system 100 can be, for instance, a server system and/or a high-performance computing (HPC) system and/or a portion thereof. Although the example shown in FIG. 1 illustrates a system having a Von Neumann architecture, embodiments of the present disclosure can be implemented in non-Von Neumann architectures, which may not include one or more components (e.g., CPU, ALU, etc.) often associated with a Von Neumann architecture.

The host 102 can be coupled to the memory device 104 via a communication path 103. The communication path 103 can include one or more buses, channels, interconnects, interfaces, or the like to facilitate transfer of data, commands, and/or instructions between the host 102 and the memory device 104. In some embodiments, the communication can include an abstracted interface. As used herein, an "abstracted interface" generally refers to a communication path that supports a memory-semantic protocol that is neither limited to, nor specific to a particular host 102 or memory device 104. As a result, an abstracted interface can support communications between various types of hosts 102 and memory devices 104 in the absence of specialized or vendor-specific protocols.

In some embodiments, an abstracted interface can be a cache coherent communication path architecture, although embodiments are not so limited. Non-limiting examples of abstracted interfaces can include a Cache Coherent Interconnect for Accelerators (CCIX) interface, a Gen-Z interface, a Hybrid Memory Cube (HMC) interface, a non-volatile dual in-line memory module (NVDIMM) interface such as an NVDIMM-P or NVDIMM-N interface, among others. In some embodiments, the abstracted interface can allow for non-deterministic response timing between the host 102 and the memory device 104.

As shown in FIG. 1, the memory device 104 can include a controller 110, a memory searching component 120, and a memory component 122. The memory searching component 120 can be resident on the memory device 104. As used herein, the term "resident on" refers to something that is physically located on a particular component. For example, the memory searching component 120 being "resident on" the memory device 104 refers to a condition in which the memory searching component 120 is physically coupled to, or physically located within the memory device 104. The term "resident on" may be used interchangeably with other terms such as "deployed on" or "located on," herein.

The memory searching component 120 can include various hardware (e.g., circuitry, logic, etc.) that can cause performance of operations to locate and retrieve particular data from the memory component 122. In some embodiments, the memory searching component 120 can include a comparator (e.g., a 64-bit comparator), a state machine (e.g., a finite state machine), an instruction set architecture such as a reduced instruction set architecture, application-specific integrated circuit (ASIC), field-programmable gate-array (FPGA), one or more processors, co-processors, and/or cores. In addition to, or in the alternative, the memory searching component 120 can cause machine-readable instructions to be executed to cause performance of operations to locate and retrieve particular data from the memory component 122.

In some embodiments, the memory searching component 120 can orchestrate and cause performance of operations to locate and retrieve particular data from the memory component 122 in response to receipt of an instruction from the host 102. For example, the host 102 can generate an instruction requesting retrieval of particular data that is stored in the memory component 122 and transfer the instructions to the memory searching component 120 via the communication path 103.

In response to receipt of the instruction, the memory searching component 120 can issue a command to commence location and retrieval of the requested data. In some embodiments, the memory searching component 120 can issue the command (e.g., the command 530 illustrated and described in connection with FIG. 5, herein) to the controller 110 to cause the controller to retrieve data from one or more search nodes of the memory component 122. When a search node of the memory component 122 is accessed, the data associated with the search node can be transferred via the controller 110 to the memory searching component 120 and the memory searching component 120 can determine if the retrieved data associated with the search node matches the requested data.

In some embodiments, the memory searching component 120 can perform various arithmetic operations, logical operations, compare operations, and/or key value comparisons to determine if the retrieved data associated with the search node match the requested data. Once the memory searching component 120 has determined that the retrieved data associated with the search node match the requested data, the memory searching component 120 can cause the retrieved data associated with the search node to be transferred to the host 102 via the communication path 103.

As described above, it may take multiple iterations of retrieving the contents of the search nodes and performing operations to determine if the retrieved data associated with the search node matches the requested data. Accordingly, in some embodiments, the memory searching component 120 can issue additional commands to the controller 110 to perform additional search and retrieval operations accessing different search nodes until the memory searching component 120 determines that the retrieved data associated with the search node match the requested data or until all search possibilities have been exhausted and a determination is made that the search for the requested data has failed.

By performing the above described operations with the memory searching component 120, data traffic over the communication path 103 can be reduced in comparison to approaches that perform such operations using the host 102. This can, in turn, reduce a quantity of operations performed by the host 102 thereby reducing power consumption of the host 102 and/or freeing up the host 102 to perform different types of operations and/or tasks that are unrelated to the search operation.

In a non-limiting example, the memory searching component (MSC) 120 can receive an external instruction (e.g., an instruction generated by the host 102) that is indicative of performance of an operation to retrieve particular data (e.g., the particular data 426-1 to 426-N illustrated in FIG. 4, herein) from the memory component 122. The MSC 120 can issue, responsive to the signaling, a command to the memory controller 110 to cause the memory controller 110 to perform a read request invoking the memory component 122 as part of performance of the operation. In some embodiments, the MSC 120 and/or the controller 110 can perform the operation in the absence of a further external instruction for, for example, the host 102. That is, in some embodiments, circuitry resident on the memory device 104 (e.g., the MSC 120 and/or the controller 110) can perform one or more of the operations described herein without encumbering the host 102.

Continuing with this example, the MSC 120 can determine whether the operation was successfully performed and, responsive to a determination that the operation was successfully performed, transfer the retrieved particular data to circuitry external to the memory device 104. If the operation was not successfully performed (e.g., if the operation was performed unsuccessfully), the 102 can, responsive to the determination that the operation was not successfully performed, reperform the read request. In some embodiments, reperforming the read request can include issuance of one or more additional signals generated by the MSC 102 to the controller 110. In some embodiments, the MSC 120 can perform a compare operation as part of determining whether the operation to retrieve the data was successful or not.

The external instruction, which is described in more detail in connection with FIG. 5, herein, that is generated by the host 102 can, in some embodiments, include address information corresponding to the particular data, a key value corresponding to the particular data, an address offset information corresponding to the particular data, or similar information that can facilitate location and retrieval of the particular (e.g., requested) data. In response to receipt of the external instruction, the MSC 120 can, as described above, issue a read request that can direct the controller 110 to read a particular address associated with the memory component. In addition, in some embodiments, the MSC 120 can perform a compare operation as part of performance of the operation to retrieve the particular data from the memory component.

The controller 110 can be responsible for executing commands received from the MSC 120 and controlling access to the memory component 122. The controller 110 can be a state machine, a sequencer, or some other type of control circuitry. The controller 110 can receive commands from the memory searching component 120 (via the communication path 105, for example) and, based on the received commands, control operation of the memory device 104 and/or the memory component 122. In some embodiments, the controller 110 can receive a command from the memory searching component 120 to cause performance of an operation to locate and retrieve particular data from the memory component 122.

The controller 110 can assert data access requests (e.g., instructions and/or commands corresponding to read requests, etc.) to the memory component 122 via the communication path 107 in order to facilitate location and retrieval of the particular data from the memory component 122. For example, responsive to receipt of one or more commands to retrieve particular data from the memory component 122, the controller 110 can assert a data access request corresponding to location (e.g., a search node) and/or retrieval of the particular data via the communication path 107 to the memory component 122.

The communication paths 105 and/or 107 can, in some embodiments, include one or more buses, interfaces, signal lines, or other communication paths that can facilitate transfer of commands and/or instructions between the memory searching component 120, the controller 110, and/or the memory component 122. In some embodiments, the communication paths 105 and/or 107 can be peripheral component interconnect buses, such as a peripheral component interconnect express (PCIe) bus, non-volatile memory interfaces, such as non-volatile memory express (NVMe) buses, or the like.

In some embodiments, the controller 110 can be a global processing controller and may provide power management functions to the memory device 104. Power management functions can include control over power consumed by the memory device 104 and/or the memory component 122. For example, the controller 110 can control power provided to various banks or sectors of the memory component 122 to control which banks or sectors of the memory component 122 are operational at different times during operation of the memory device 104. This can include controlling the memory component 122 to optimize power consumption of the memory device 104.

The memory component 122 can include volatile memory resources, non-volatile memory resources, or a combination of volatile and non-volatile memory resources. In some embodiments, the memory resources can be random-access memory (RAM) such as static random-access memory (SRAM).

Embodiments are not so limited, however, and the memory resource can be a cache, one or more registers, NVRAM, ReRAM, FeRAM, MRAM, PCM), "emerging" memory devices (e.g., resistance variable memory devices) that include an array of self-selecting memory (SSM) cells, etc., or combinations thereof. Resistance variable memory devices can perform bit storage based on a change of bulk resistance, in conjunction with a stackable cross-gridded data access array. Additionally, in contrast to many flash-based memories, resistance variable non-volatile memory can perform a write in-place operation, where a non-volatile memory cell can be programmed without the non-volatile memory cell being previously erased. In contrast to flash-based memories and resistance variable memories, self-selecting memory cells can include memory cells that have a single chalcogenide material that serves as both the switch and storage element for the memory cell.

In embodiments in which the memory component 122 includes non-volatile memory, the memory component can include flash-based memory, such as NAND flash, NOR flash, a solid-state drive, etc. In such embodiments, data can be stored within the memory component 122 according to various data storage schemes. In one such scheme, the data can be stored in a data structure within the memory component 122. In some embodiments, data that is stored within the data structure can be accessed by accessing a search node (e.g., the search nodes 424-1 to 424-N illustrated in FIG. 4, herein) and subsequently accessing data requested by the host 102 (e.g., the particular data 426-1 to 426-N illustrated in FIG. 4, herein). As described herein, the data accesses can be orchestrated by the MSC 120 in response to receipt of an instruction from, for example, the host 102.

Figure 2:
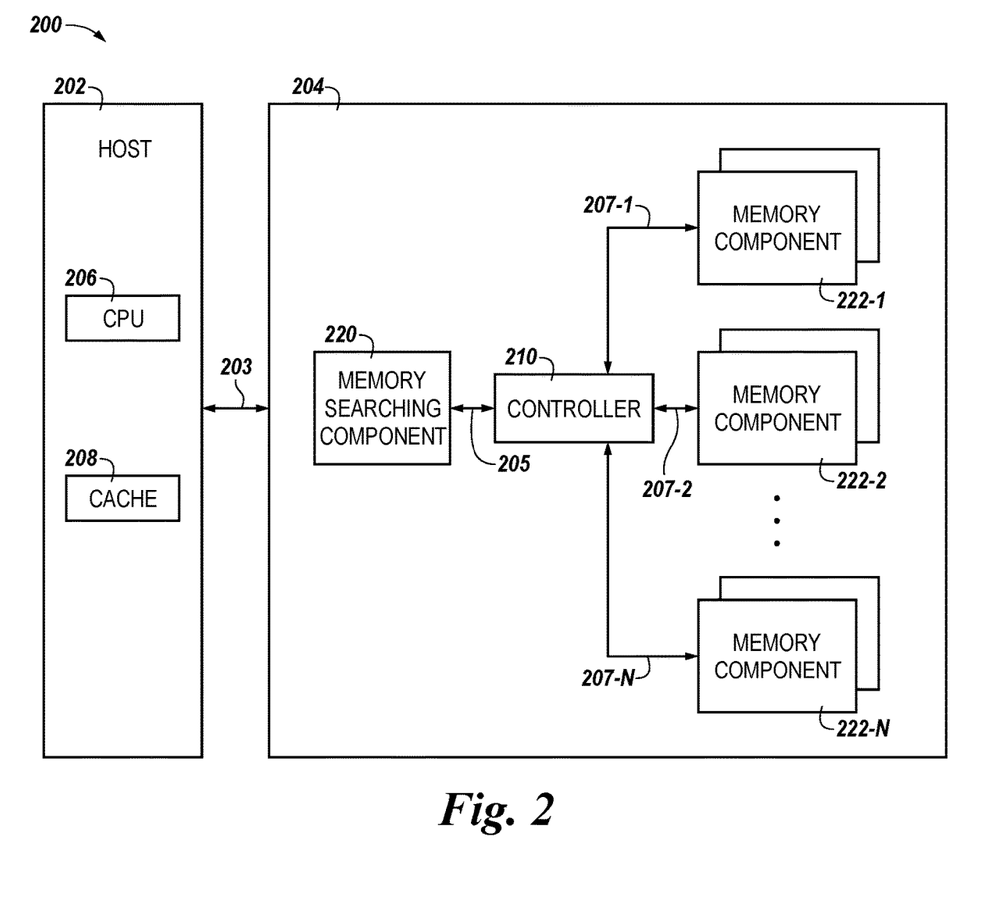
FIG. 2 is another functional block diagram in the form of an apparatus including a host and memory device in accordance with a number of embodiments of the present disclosure.

FIG. 2 is another functional block diagram in the form of an apparatus 200 including a host 202 and memory device 204 in accordance with a number of embodiments of the present disclosure. The host 202 and/or the memory device 204 can be analogous to the host 102 and the memory device 104 illustrated in FIG. 1, herein. As shown in FIG. 2, the host 202 can include a CPU 206 and a cache 208, which can be analogous to the CPU 106 and cache 108 illustrated in FIG. 1, respectively. Further, the memory device 204 can include a controller 210, a memory searching component 220, and a plurality of memory components 222-1 to 222-N, which can be analogous to the controller 110, the memory searching component 120, and the memory component 122 illustrated in FIG. 1.

The host 202 can be communicatively coupled to the memory device 204 via a communication path 203, which can be analogous to the communication path 103 illustrated in FIG. 1, herein. The memory searching component 220 can be communicatively coupled to the controller 210 via a communication path 205, which can be analogous to the communication path 105 illustrated in FIG. 1, herein.

In the embodiment illustrated in FIG. 2, the controller 210 is communicatively coupled to a plurality of memory components 222-1 to 222-N via respective communication paths 207-1 to 207-N. The communication paths 207-1 to 207-N can be analogous to the communication path 107 illustrated in FIG. 1, herein. In such embodiments, the memory searching component 220 can issue one or more commands to the controller 210 to cause the controller 210 to locate and retrieve particular data stored within one or more of the memory components 222-1 to 222-N, as described above.

By providing a single controller 210 to performing searching operations in response to commands generated by the memory searching component 220, an amount of circuitry deployed within the memory device 204 may be reduced in comparison to some other embodiments. However, in order to perform searching operations across multiple memory components 222-1 to 222-N, the controller 210 may require additional circuitry (e.g., additional processing resources, etc.) than some other embodiments.

Figure 3:
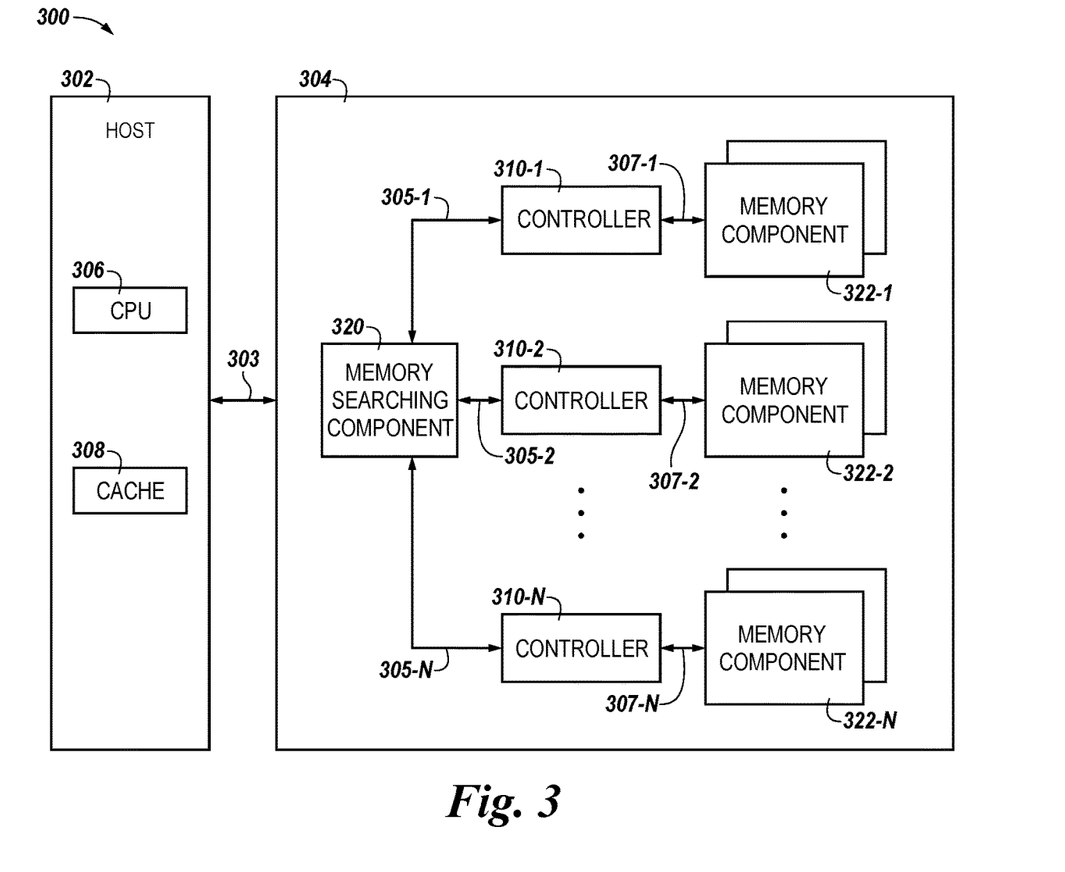
FIG. 3 is yet another functional block diagram in the form of an apparatus including a host and memory device in accordance with a number of embodiments of the present disclosure.

FIG. 3 is yet another functional block diagram in the form of an apparatus 300 including a host 302 and memory device 304 in accordance with a number of embodiments of the present disclosure. The host 302 and/or the memory device 304 can be analogous to the host 102 and the memory device 104 and/or the host 202 and the memory device 204 illustrated in FIGS. 1 and 2, herein. As shown in FIG. 3, the host 302 can include a CPU 306 and a cache 308, which can be analogous to the CPU 106 and cache 108 and/or the CPU 206 and the cache 208 illustrated in FIGS. 1 and 2, respectively. Further, the memory device 304 can include a plurality of controllers 310-1 to 310-N, a memory searching component 320, and a plurality of memory components 322-1 to 322-N, which can be analogous to the controller 110, the memory searching component 120, and the memory component 122 and/or the controller 210, the memory searching component 220, and the memory component 222 illustrated in FIGS. 1 and 2, herein.

The host 302 can be communicatively coupled to the memory device 304 via a communication path 303, which can be analogous to the communication path 103 and/or the communication path 203 illustrated in FIGS. 1 and 2, herein. The memory searching component 320 can be communicatively coupled to the controllers 310-1 to 310-N via respective communication paths 305-1 to 305-N, which can be analogous to the communication path 105 and/or the communication path 205 illustrated in FIGS. 1 and 2, herein.

In the embodiment illustrated in FIG. 3, each of the controllers 310-1 to 310-N are communicatively coupled to respective memory components 322-1 to 322-N via respective communication paths 307-1 to 307-N, which can be analogous to the communication path 107 and/or the communication paths 207-1 to 207-N illustrated in FIGS. 1 and 2, herein. In such embodiments, the memory searching component 320 can issue one or more commands to the controllers 310-1 to 310-N to cause the controllers 310-1 to 310-N to locate and retrieve particular data stored within one or more of the memory components 322-1 to 322-N, as described above.

In a non-limiting example, the memory device 304 is coupled to the host 302 via an abstracted interface 303. The memory device 304 includes a memory searching component (MSC) 320 resident thereon and a plurality of memory components 322-1 to 322-N resident thereon. The MSC 320 can receive, from the host 302 and via the abstracted interface 303, an instruction indicative of performance of an operation to retrieve particular data (e.g., the particular data 426-1 to 426-N illustrated in FIG. 4, herein) from at least one of the memory components 322-1 to 322-N.

The MSC 320 can cause, responsive to the instruction, performance of a read request invoking at least one of the memory components 322-1 to 322-N as part of performance of the operation. The MSC 320 can determine whether the operation was successfully performed and, responsive to the determination that the operation was successfully performed, transfer the retrieved particular data to the host 302 via the abstracted interface 303.

To determine whether the operation was performed successfully, the MSC 320 can perform various arithmetic and/or logical operations. For example, the MSC 320 can perform one or more compare operations in which the retrieved data is checked to determine the efficacy of the operation to retrieve the particular data.

In some embodiments, the MSC 320 can transfer the retrieved particular data to the host 302 in a non-deterministic fashion. For example, the MSC 320 can transfer the retrieved particular data to the host 302 in a manner that does not necessarily follow a strict clocking or timing pattern. For example, because it is possible that data retrieved from the memory components 322-1 to 322-N can take differing amounts of time to retrieve from the memory components 322-1 to 322-N, the MSC 320 can cause the retrieved data to be transferred to host 302 in the absence of a strict timing or clocking signal.

The MSC 320 can further cause performance of a first read request invoking a first memory component (e.g., the memory component 322-1) among the plurality of memory components 322-1 to 322-N and a second read request invoking a second memory component (e.g., the memory component 322-2) among the plurality of memory components 322-1 to 322-N substantially concurrently as part of performance of the operation. That is, in some embodiments, the MSC 320 can cause performance of multiple read request operations in parallel, provided that the particular data being retrieved is capable of being searched in parallel.

As used herein, the term "substantially" intends that the characteristic needs not be absolute, but is close enough so as to achieve the advantages of the characteristic. For example, "substantially concurrently" is not limited to operations that are performed absolutely concurrently and can include timings that are intended to be concurrent but due to manufacturing limitations may not be precisely concurrently. For example, due to read/write delays that may be exhibited by various interfaces (e.g., DDR vs PCIe) a first and second read request that are performed "substantially concurrently" may not start or finish at exactly the same time. For example, the first and second read requests may be performed such they are being performed at the same time regardless if one of the first and second read requests commences or terminates prior to the other.

In some embodiments, the MSC 320 can be deployed between a last level cache 308 of the host 302 and a memory controller (e.g., the controller 310) that is coupled to at least one of the memory components 322-1 to 322-N.

By providing controllers 310-1 to 310-N in a 1:1 pairing with the memory components 322-1 to 322-N to perform searching operations in response to commands generated by the memory searching component 320, an amount of circuitry deployed within the memory device 304 may be increased in comparison to some other embodiments. However, in order to perform searching operations across multiple memory components 322-1 to 322-N, the controllers 310-1 to 310-N may require less circuitry (e.g., fewer processing resources, etc.) than some other embodiments. In addition, under certain data retrieval conditions, parallelism of data retrieval operations can be realized in embodiments in which the controllers 310-1 to 310-N are provided in a 1:1 pairing with the memory components 322-1 to 322-N.

Figure 4:
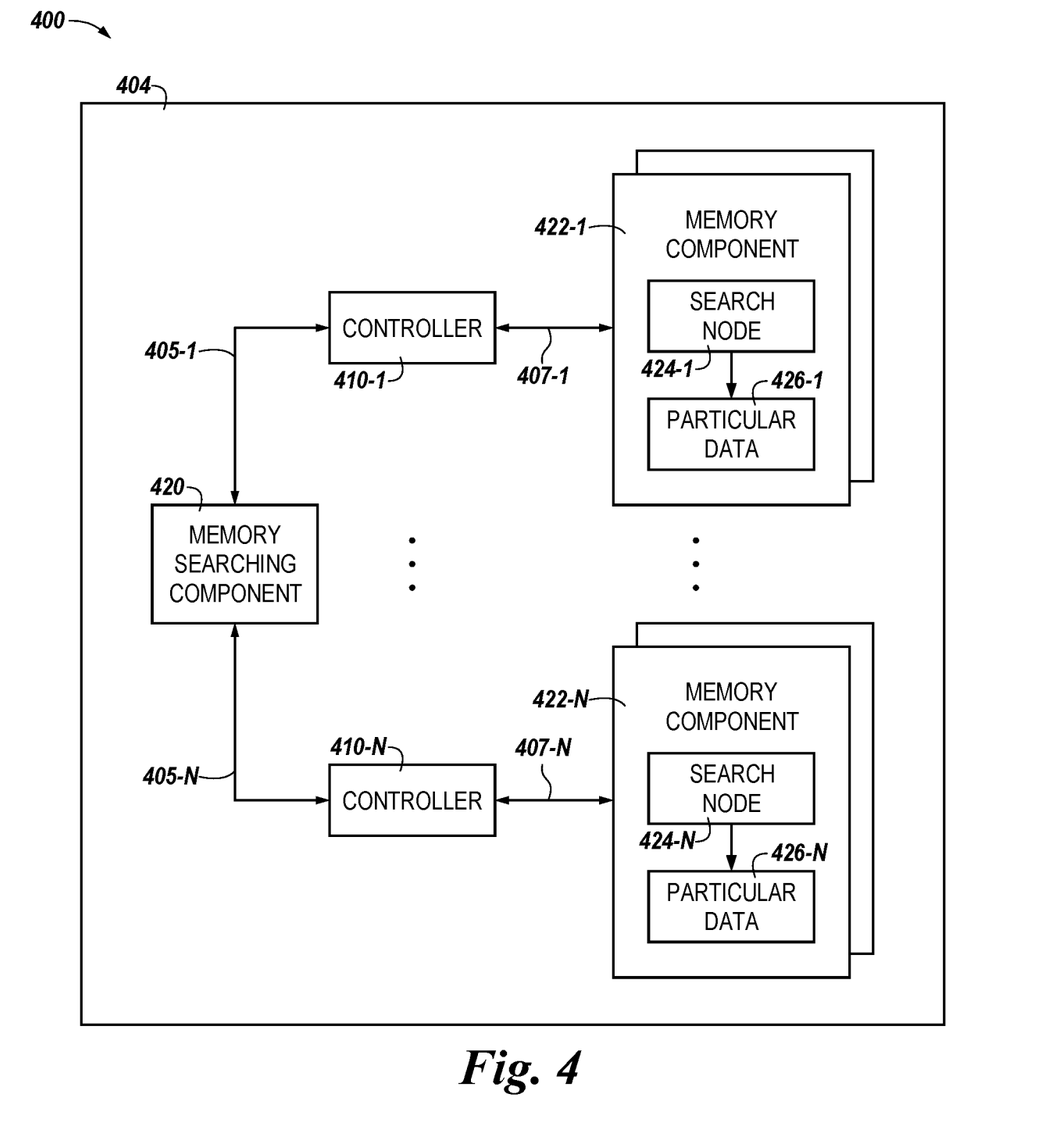
FIG. 4 is a functional block diagram in the form a memory device in accordance with a number of embodiments of the present disclosure.

FIG. 4 is a functional block diagram in the form of a memory device 404 in accordance with a number of embodiments of the present disclosure. The memory device 404 can be analogous to the memory devices 104, 204, and/or 304 illustrated in FIGS. 1, 2, and 3, herein. The memory device 404 can include a plurality of controllers 410-1 to 410-N, a memory searching component 420, and a plurality of memory components 422-1 to 422-N, which can be analogous to the controller 110, 210, and/or 310, the memory searching component 120, 220, and/or 320, and the memory component 122, 222, and/or 322 illustrated in FIGS. 1, 2, and 3, respectively.

In the embodiment illustrated in FIG. 4, each of the controllers 410-1 to 410-N are communicatively coupled to respective memory components 422-1 to 422-N via respective communication paths 407-1 to 407-N, which can be analogous to the communication paths 107, 207-1 to 207-N, and/or 307-1 to 307-N illustrated in FIGS. 1, 2, and 3, herein. In such embodiments, the memory searching component 420 can issue one or more commands to the controllers 410-1 to 410-N to cause the controllers 410-1 to 410-N to locate and retrieve particular data stored within one or more of the memory components 422-1 to 422-N, as described above.

As shown in FIG. 4, the memory components 422-1 to 422-N include respective search nodes 424-1 to 424-N and respective particular data 426-1 to 426-N. In embodiments in which the particular data 426-1 to 426-N are organized in a tree structure, the search nodes 424-1 to 424-N can include at least one of a key and an associated value. The search nodes 424-2 to 424-N can correspond to a root node for the tree structure and the particular data 426-1 to 426-N can be accessed through traversal of the tree structure based on the key and/or the associated value of the search nodes 424-1 to 424-N.

In some embodiments, the memory searching component 420 can generate a command corresponding to a data access to be performed by the controllers 410-1 to 410-N. The memory searching component 420 can issue the command to the controllers 410-1 to 410-N to initiate performance of an operation to retrieve particular data 426-1 to 426-N.

In response to receipt of the command, the controllers 410-1 to 410-N can perform various operations to locate the particular data 426-1 to 426-N and retrieve the particular data 426-1 to 426-N from the memory components 422-1 to 422-N. The controllers 410-1 to 410-N can cause the particular data 426-1 to 426-N to be transferred to the memory searching component 420, and the memory searching component 420 can perform arithmetic and/or logical operations using the particular data 426-1 to 426-N to determine if the retrieved particular data 426-1 to 426-N matches the requested data.

If the retrieved data does not match the requested data, the memory searching component 420 can issue one or more additional commands to the controllers 410-1 to 410-N to conduct further search operations to attempt to locate and retrieve particular data 426-1 to 426-N that matches the requested data. As described above, this process may be repeated until the memory searching component 420 determines that the retrieved data matches the requested data. Once the memory searching component 420 determines that the data matches the requested data, the memory searching component 420 can cause the data to be transferred to circuitry external to the memory device 404 (e.g., to a host such as the host 102, 202, and/or 302 illustrated in FIGS. 1-3, above).

Figure 5:
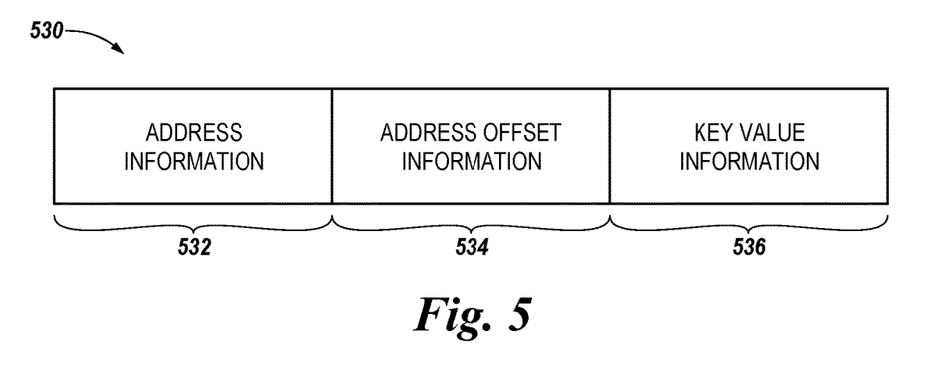
FIG. 5 is an example of a command generated by a memory searching component in accordance with a number of embodiments of the present disclosure.

FIG. 5 is an example of a command 530 received by a memory searching component (e.g., the memory searching component 120, 220, 320, and/or 420 illustrated in FIGS. 1-4, herein) in accordance with a number of embodiments of the present disclosure. In some embodiments, the command 530 can include address information 532, address offset information 534, and/or key value information 536. The command 530 can include additional information not explicitly illustrated in FIG. 5 as necessary to facilitate location and retrieval of particular data (e.g., the particular data 426-1 to 426-N illustrated in FIG. 4, herein). In some embodiments, the command can be generated by a host (e.g., the host 102, 202, 302 illustrated in FIGS. 1-3, herein) and transferred to the memory searching component via an abstracted interface (e.g., the interface 102, 203, 303 illustrated in FIGS. 1-3, herein).

The address information 532 can correspond to an address in a memory component (e.g., the memory components 122, 222, 322, and/or 422 illustrated in FIGS. 1-4, herein) at which a data search operation to locate and retrieve particular data (e.g., the particular data 426-1 to 426-N illustrated in FIG. 4, herein) may commence. The address offset information 534 can correspond to a particular number of memory locations within a memory component by which the data search operation may be offset prior to commencement of the data search operation. The key value information 536 can correspond to the key and/or associated value associated with a search node (e.g., the search nodes 424-2 to 424-N illustrated in FIG. 4, herein).

As described above, the command 530 can be generated by a host and transferred to the memory searching component. In response to receipt of the command 530, the memory searching component can generate and issue a command or instruction to a controller (e.g., the controller 110, 210, 310, and/or 410 illustrated in FIGS. 1-4, herein) and the controller can issue a data access request to begin searching for the requested data, as described above. In some embodiments, the command or instruction generated by the memory searching component can be a read access command and can include information pertinent to an address in a memory component at which a search operation is to commence.

Figure 6:
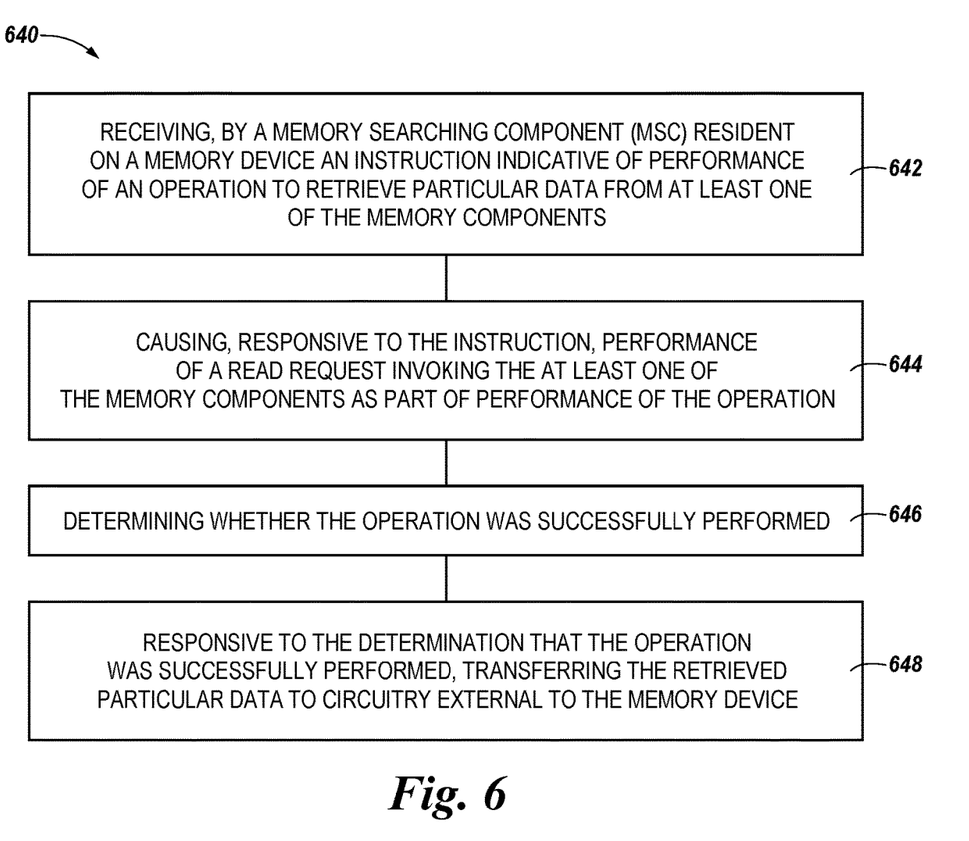
FIG. 6 is a flow diagram representing an example method relating to a memory searching component in accordance with a number of embodiments of the present disclosure.

FIG. 6 is a flow diagram representing an example method 640 for dynamic precision bit string accumulation in accordance with a number of embodiments of the present disclosure. The method 640 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 642, the method 640 can include receiving, by a memory searching component (MSC) resident on a memory device an instruction indicative of performance of an operation to retrieve particular data from at least one of the memory components. The method 640 can further include receiving, by the MSC, the instruction indicative of performance of the operation via an abstracted interface. In some embodiments, the instruction can include address information corresponding to the particular data, a key value corresponding to the particular data, or address offset information corresponding to the particular data, or any combination thereof.

At block 644, the method 640 can include causing, responsive to the instruction, performance of a read request invoking the at least one of the memory components as part of performance of the operation. At block 646, the method 640 can include determining whether the operation was successfully performed. In some embodiments, the method 640 can include comprising performing, by the MSC, a compare operation as part of performance of the determining whether the operation was successfully performed.

At block 648, the method 640 can include responsive to the determination that the operation was successfully performed, transferring the retrieved particular data to circuitry external to the memory device. In some embodiments, the method 640 can include transferring, by the MSC, the retrieved particular data to the circuitry external to the memory device in a non-deterministic fashion.

In some embodiments, the method 640 can include receiving, by at least one memory controller among a plurality of memory controllers coupled to the MSC and to a respective one of the plurality of memory components, a command indicative of performance of the read request from the MSC, causing performance of the read request to retrieve the particular data from the respective one of the memory components that is coupled to the at least one of the memory controllers, and/or transferring the retrieved particular data to the MSC.

The method 640 can further include causing performance of the read request to retrieve the particular data and transferring the retrieved particular data to the MSC are performed in the absence of an additional instruction or command, or both.

The method 640 can include causing, by the MSC, performance of a first read request invoking a first memory component among the plurality of memory components and a second read request invoking a second memory component among the plurality of memory components substantially concurrently as part of performance of the operation.

In some embodiments, a method can include receiving, by a memory searching component (MSC), such as the MSC 420 illustrated in FIG. 4, a search command comprising an address of a starting node (e.g., the search node(s) 424-1 to 424-N illustrated in FIG. 4) and information corresponding to a request node (e.g., a node associated with the particular data 426-1 to 426-N illustrated in FIG. 4). In some embodiments, the request node can included in a serially accessible data structure, such as a linked list, a graph, or other serially accessed data structure. The method can further include issuing, by the MSC, a read request to retrieve particular data (e.g., the particular data 426-1 to 426-N illustrated in FIG. 4) associated with the request node, receiving, by the MSC, data associated with the request node, and/or determining, by the MSC, whether the received data corresponds to the particular data associated with the request node.

The method can further include comparing, by the MSC, the received data with the particular data associated with the request node as part of determining whether the received data corresponds to the particular data associated with the request node. In some embodiments, the method can include determining, by the MSC, that the received data corresponds to the particular data associated with the request node and causing, by the MSC, the received data to be transferred to a host couplable to the MSC. Embodiments are not so limited, however, and in some embodiments, the method can include determining, by the MSC, that the received data does not correspond to the particular data associated with the request node, extracting, by the MSC, an address associated with at least one node that is connected to the request node, and issuing, by the MSC, a second read request to retrieve particular data associated with the request node, wherein the second read request includes the address associated with the at least one node that is connected to the request node.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a memory device comprising a memory component and a memory controller coupled to the memory component; and
a memory searching component (MSC) resident on the apparatus and configured to:
receive an external instruction indicative of performance of an operation to retrieve particular data from the memory component;
issue, responsive to receipt of the instruction, a command to the memory controller to cause the memory controller to perform a read request invoking the memory component as part of performance of the operation in the absence of a further external instruction; and
determine whether the operation was successfully performed.

2. The apparatus of claim 1, wherein the MSC is configured to:
responsive to the determination that the operation was successfully performed, transfer the retrieved particular data to circuitry external to the memory device.

3. The apparatus of claim 1, wherein the MSC is configured to:
determine whether the operation was not successfully performed; and
responsive to the determination that the operation was not successfully performed, reperform the read request.

4. The apparatus of claim 1, wherein the MSC is configured to receive the signaling indicative of performance of the operation via an abstracted interface such that the operation is performed in a non-deterministic fashion.

5. The apparatus of claim 1, wherein the MSC comprises a state machine or a comparator, or both.

6. The apparatus of claim 1, wherein the MSC is configured to perform a compare operation as part of performance of the operation to retrieve the particular data from the memory component.

7. The apparatus of claim 1, wherein the external instruction includes address information corresponding to the particular data, a key value corresponding to the particular data, or address offset information corresponding to the particular data, or any combination thereof.

8. The apparatus of claim 1, wherein the apparatus comprises a memory system, a memory device, or a memory sub-system.

9. A method, comprising:
receiving, by a memory searching component (MSC), an instruction indicative of performance of an operation to retrieve particular data from at least one memory component of a memory device;
issuing, by the MSC, a command to a memory controller to cause the memory controller to perform a read request invoking the at least one memory component as part of performance of the operation;
causing, responsive to the command, performance of a read request invoking the at least one memory component as part of performance of the operation;
determining whether the operation was successfully performed; and
responsive to the determination that the operation was successfully performed, transferring the retrieved particular data to circuitry external to the memory device.

10. The method of claim 9, further comprising:
receiving, by at least one memory controller among a plurality of memory controllers coupled to the MSC and to a respective one of the plurality of memory components, a command indicative of performance of the read request from the MSC;
causing performance of the read request to retrieve the particular data from the respective one of the memory components that is coupled to the at least one of the memory controllers; and
transferring the retrieved particular data to the MSC.

11. The method of claim 10, further comprising causing performance of the read request to retrieve the particular data and transferring the retrieved particular data to the MSC are performed in the absence of an additional instruction or command, or both.

12. The method of claim 9, further comprising causing, by the MSC, performance of a first read request invoking a first memory component among the plurality of memory components and a second read request invoking a second memory component among the plurality of memory components substantially concurrently as part of performance of the operation.

13. The method of claim 9, further comprising receiving, by the MSC, the instruction indicative of performance of the operation via an abstracted interface.

14. The method of claim 9, further comprising transferring, by the MSC, the retrieved particular data to the circuitry external to the memory device in a non-deterministic fashion.

15. The method of claim 9, further comprising performing, by the MSC, a compare operation as part of determining whether the operation was successfully performed.

16. The method of claim 9, wherein the instruction includes address information corresponding to the particular data, a key value corresponding to the particular data, or address offset information corresponding to the particular data, or any combination thereof.

17. A method, comprising:
receiving, by a memory searching component (MSC), a search command comprising an address of a starting node and information corresponding to a request node;
issuing, by the MSC, a read request to a memory controller coupled to the MSC to retrieve particular data associated with the request node;
receiving, by the MSC, data associated with the request node; and
determining, by the MSC, whether the received data corresponds to the particular data associated with the request node.

18. The method of claim 17, further comprising comparing, by the MSC, the received data with the particular data associated with the request node as part of determining whether the received data corresponds to the particular data associated with the request node.

19. The method of claim 17, further comprising:
determining, by the MSC, that the received data corresponds to the particular data associated with the request node; and
causing, by the MSC, the received data to be transferred to a host couplable to the MSC.

20. The method of claim 17, further comprising:
determining, by the MSC, that the received data does not correspond to the particular data associated with the request node;
extracting, by the MSC, an address associated with at least one node that is connected to the request node; and
issuing, by the MSC, a second read request to retrieve particular data associated with the request node, wherein the second read request includes the address associated with the at least one node that is connected to the request node.

21. The method of claim 17, wherein the request node is included in a serially accessible data structure.

22. A system, comprising:
a host;
an apparatus comprising a plurality of memory components and a memory searching component (MSC) resident thereon, wherein the apparatus is coupled to the host via an abstracted interface, and wherein the MSC is configured to:
receive, from the host and via the abstracted interface, an instruction indicative of performance of an operation to retrieve particular data from at least one of the memory components;
issue a command to a memory controller that is coupled to the MSC and the plurality of memory components, the command to cause the memory controller to perform a read request invoking the at least one of the plurality of memory components as part of performance of the operation;
cause, responsive to the command, performance of a read request invoking at least one of the plurality of memory components as part of performance of the operation;
determine whether the operation was successfully performed; and
responsive to the determination that the operation was successfully performed, transfer the retrieved particular data to the host via the abstracted interface in the absence of a further host instruction.

23. The system of claim 22, wherein the MSC is configured to transfer the retrieved particular data to the host in a non-deterministic fashion.

24. The system of claim 22, wherein the MSC is configured to perform a compare operation as part of performance of the operation to retrieve the particular data.

25. The system of claim 22, wherein the MSC is configured to cause performance of a first read request invoking a first memory component among the plurality of memory components and a second read request invoking a second memory component among the plurality of memory components substantially concurrently as part of performance of the operation.

26. The system of claim 22, wherein the MSC is deployed between a last level cache of the host and a memory controller coupled to at least one memory component among the plurality of memory components.

\* \* \* \* \*